(12) United States Patent
Hattori et al.

(10) Patent No.: US 8,906,545 B2
(45) Date of Patent: Dec. 9, 2014

(54) PRISMATIC SECONDARY BATTERY

(71) Applicants: SANYO Electric Co., Ltd., Moriguchi-shi, Osaka (JP); Toyota Jidosha Kabushiki Kaisha, Toyota-shi, Aichi (JP)

(72) Inventors: Takayuki Hattori, Kasai (JP); Eiji Okutani, Kasai (JP); Yoshiya Maruyama, Kasai (JP); Yasuhiro Yamauchi, Kasai (JP); Hironori Harada, Nukata-gun (JP); Toshihiro Takada, Nagoya (JP); Hiroshi Inukai, Toyota (JP)

(73) Assignees: SANYO Electric Co., Ltd., Moriguchi-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 190 days.

(21) Appl. No.: 13/750,639

(22) Filed: Jan. 25, 2013

(65) Prior Publication Data
US 2013/0196221 A1    Aug. 1, 2013

(30) Foreign Application Priority Data
Jan. 27, 2012    (JP) .................................. 2012-015375

(51) Int. Cl.
*H01M 2/30*    (2006.01)
*H01M 2/02*    (2006.01)
*H01M 2/34*    (2006.01)

(52) U.S. Cl.
CPC ............... *H01M 2/0217* (2013.01); *H01M 2/34* (2013.01)
USPC ....................................................... 429/179

(58) Field of Classification Search
CPC ......... H01M 2/02; H01M 2/06; H01M 2/305; H01M 2/08; H01M 2/30
USPC ................................... 429/179, 178, 182, 181
See application file for complete search history.

(56) References Cited

U.S. PATENT DOCUMENTS

| 8,232,002 B2 | 7/2012 | Yamauchi et al. |
| 8,241,786 B2 | 8/2012 | Taniguchi et al. |
| 2008/0241679 A1* | 10/2008 | Okutani et al. ............... 429/185 |

(Continued)

FOREIGN PATENT DOCUMENTS

| JP | 2004-014173 A | 1/2004 |
| JP | 2008-251411 A | 10/2008 |

(Continued)

*Primary Examiner* — Patrick Ryan
*Assistant Examiner* — Kiran Quraishi
(74) *Attorney, Agent, or Firm* — Westerman, Hattori, Daniels & Adrian, LLP

(57) ABSTRACT

A crimped portion of a positive electrode external terminal is crimped on its upper end side to be electrically connected to a positive electrode terminal plate. This crimped portion is welded to the positive electrode terminal plate by applying high energy beams. The negative electrode side has a configuration similar to that of the positive electrode side. The contact area between the positive electrode terminal plate and the crimped portion of the positive electrode external terminal is set smaller than the corresponding contact area on the negative electrode side, and the volume of the crimped portion of the positive electrode external terminal is set larger than that of the corresponding crimped portion on the negative electrode side. Thus, a prismatic secondary battery is provided that shows strong joining strength between the external terminal and the terminal plate, suppressed internal resistance variations, and improved reliability.

12 Claims, 10 Drawing Sheets

(56) References Cited

U.S. PATENT DOCUMENTS

2009/0087737 A1* 4/2009 Yamauchi et al. ............ 429/185
2011/0045345 A1 2/2011 Tsuchiya et al.
2011/0076552 A1* 3/2011 Taniguchi et al. ............ 429/181

FOREIGN PATENT DOCUMENTS

| JP | 2009-87693 A | 4/2009 |
| JP | 2009-283256 A | 12/2009 |
| JP | 2010-33766 A | 2/2010 |
| JP | 2011-076867 A | 4/2011 |

* cited by examiner

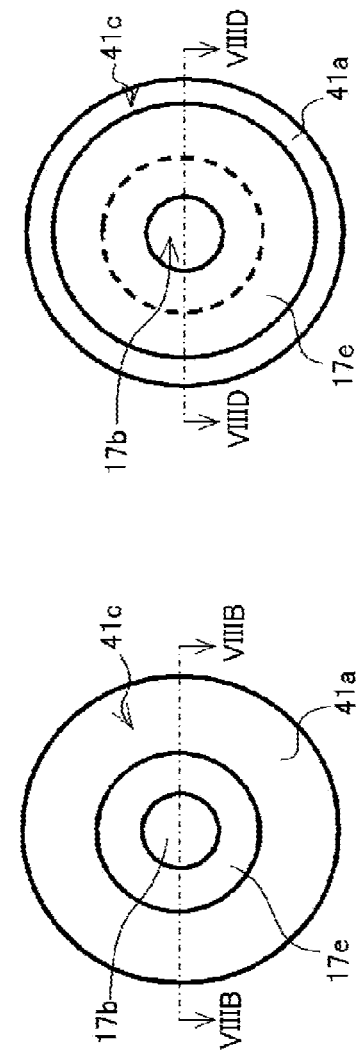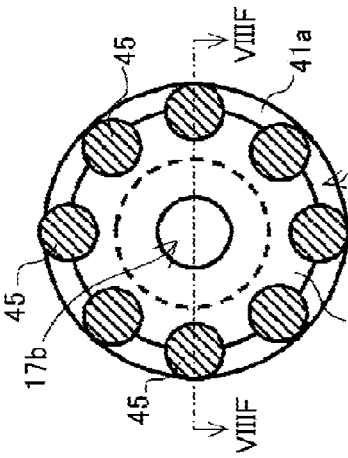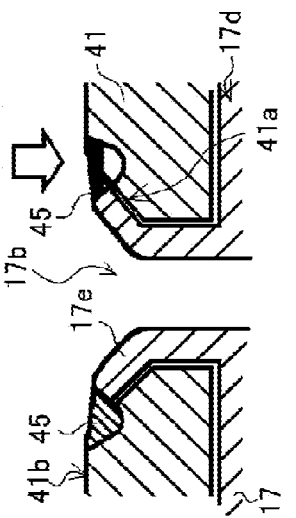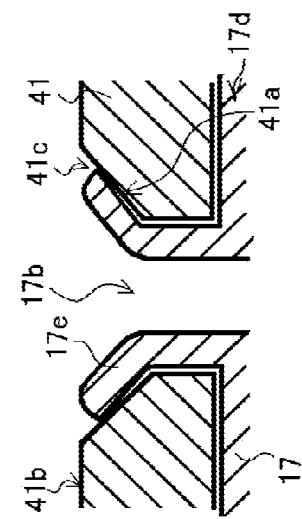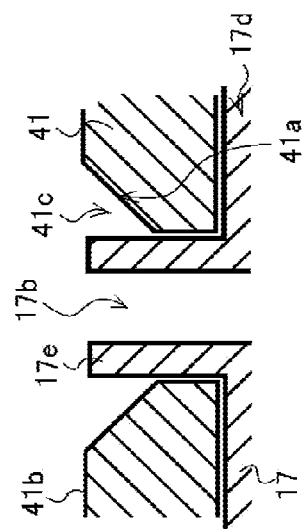

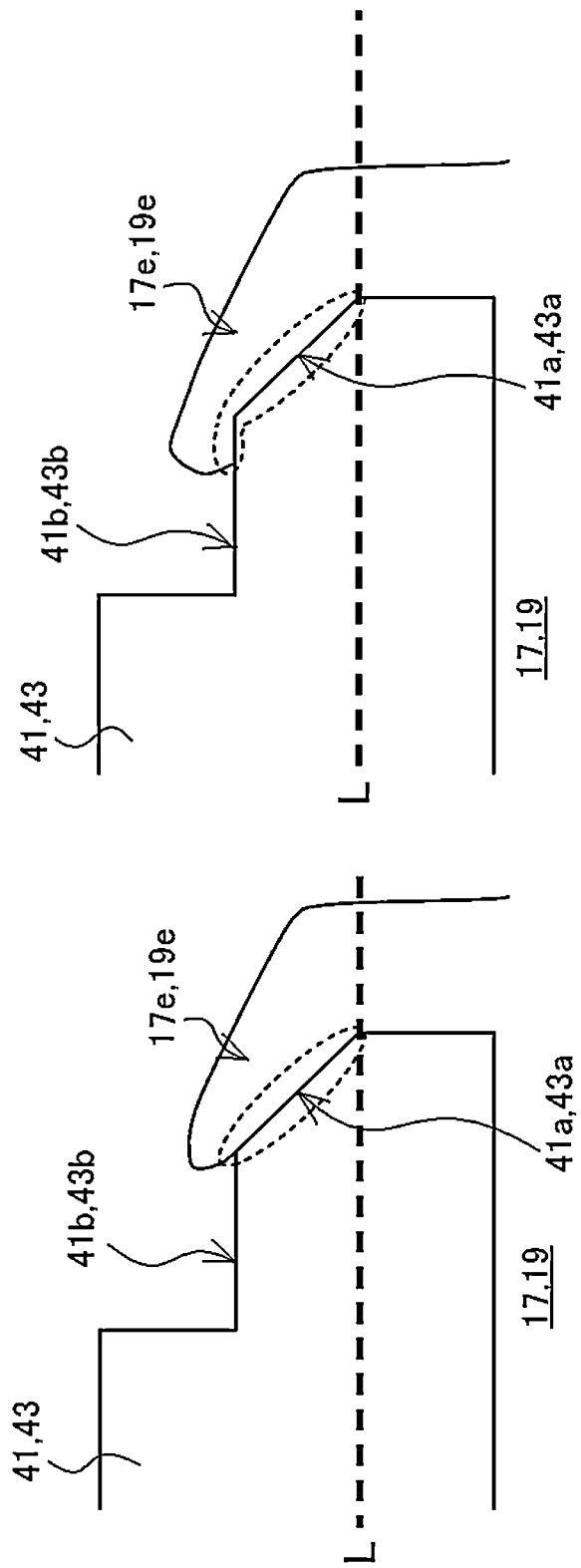

ary battery, aluminum is often used as a constituent material of a positive electrode collector, whereas copper is often used as a constituent material of a negative electrode collector.

PRISMATIC SECONDARY BATTERY

TECHNICAL FIELD

The present invention relates to a prismatic secondary battery having a joint portion where an external terminal and a terminal plate are connected by a crimped portion and by welding with high energy beams.

BACKGROUND ART

As the drive power sources for portable electronic equipment such as mobile telephones (including smartphones), portable computers, PDAs, and portable music players, much use is made of alkaline secondary batteries and nonaqueous electrolyte secondary batteries, typified by nickel-hydrogen batteries and lithium ion batteries, respectively. Furthermore, alkaline secondary batteries and nonaqueous electrolyte secondary batteries are also much used as drive power sources for electric vehicles (EVs) and hybrid electric vehicles (HEVs, PHEVs), and in stationary storage battery systems in applications for curbing output variation of photovoltaic power generation and wind power generation, etc., in grid power peak load shifting applications for storing power at night and using it in the daytime, and in other applications. Particularly in EV, HEV and PHEV applications or stationary storage battery systems, high capacity and high output characteristics are required. Individual batteries accordingly get larger and are used connected in series or in parallel. Prismatic secondary batteries are widely used in such cases, because of their space efficiency.

In the prismatic secondary batteries used in these applications, it is necessary not only to increase battery capacity but also to achieve high-power output. Large current flows in the battery during discharge at high-power output, and therefore, a reduction in battery internal resistance is required. Thus, a variety of improvements have been made for realizing higher reliability and lower resistance at a joint portion of a terminal portion or inside the battery for the purpose of minimizing the battery internal resistance and eliminating variations in internal resistance.

Mechanical crimping has been often used in the related art for realizing lower resistance at a joint portion of a battery terminal portion or inside a battery. However, with only mechanical crimping, electrical resistance varies over time under environments with frequent vibrations as in EVs, HEVs, PHEVs, and the like. Therefore, the boundary portion of the crimped joint portion is welded with high energy beams such as laser beams, as disclosed in JP-A-2009-087693, JP-A-2008-251411, and JP-A-2010-033766. In this case, only part of the boundary portion is welded in the form of a spot with high energy beams because, the portion under the force of crimping is melted if the boundary portion is entirely welded, and the force of crimping becomes weak. JP-A-2008-251411 and JP-A-2010-033766 show examples in which welding with high energy beams is performed for each of a plurality of regions along the boundary portion of the crimped joint portion such that a plurality of weld spots overlap each other.

Among those examples, a method of forming a joint portion between a collector and a terminal as disclosed in JP-A-2008-251411 will be described with reference to FIG. 10, in the case of using laser beams as high energy beams. FIG. 10A is a sectional view showing a step of processing a tip of a crimped portion of a terminal as disclosed in JP-A-2008-251411, FIG. 10B shows a step of laser-welding after the step in FIG. 10A, FIG. 10C is a plan view of FIG. 10B, and FIG. 10D is a plan view after laser welding is repeated a plurality of times such that a plurality of weld spots overlap each other.

A joint portion 60 between a collector and a terminal as disclosed in JP-A-2008-251411 includes a cover plate 61 fixed to a battery outer casing (not shown), an inner insulating sealing material 62 and an outer insulating sealing material 63, a collector 64 connected to a power generating element, and a rivet terminal 65. The inner insulating sealing material 62 and the outer insulating sealing material 63 have a through hole and are disposed at the inner and outer peripheral portions of an opening formed in the cover plate 61. The collector 64 is arranged to overlie the inner insulating sealing material 62. The rivet terminal 65 has a crimped portion 65b projecting from a jaw portion 65a.

The joint portion 60 is assembled such that the crimped portion 65b of the rivet terminal 65 passes from the outer peripheral side of the cover plate 61 through the outer insulating sealing material 63, the opening of the cover plate 61, the inner insulating sealing material 62, and a rivet terminal hole of the collector 64. Subsequently, the joint portion 60 is integrated by crimping the crimped portion 65b of the rivet terminal 65 so as to press the collector 64. A processing punch A is prepared, which has a concave portion complementary to the crimped portion 65b of the rivet terminal 65 and has a slanted portion A1 at a particular angle at the edge of the concave portion. The processing punch A is then pushed such that the slanted portion A1 abuts on a tip 65c of the crimped portion 65b to partially deform the tip 65c of the crimped portion 65b. As shown in FIG. 10B, the tip 65c of the crimped portion 65b is thus formed into a truncated-cone shape. Consequently, the shape of the tip 65c of the crimped portion 65b is adjusted to form an obtuse angle.

As shown in FIG. 10B and FIG. 10C, laser welding is performed by applying laser beams LB in the vertical direction or the direction therearound on the upper surface of the truncated-cone portion of the tip 65c of the crimped portion 65b. Here, the range of applying laser beams LB is set to include at least the collector 64 and the truncated-cone portion of the tip 65c of the crimped portion 65b, thereby the collector 64 and the truncated-cone portion of the tip 65c of the crimped portion 65b are butt-welded. This laser spot welding enables the uniform transmission of the energy of laser beams applied to both the collector 64 and the truncated-cone portion of the tip 65c of the crimped portion 65b, so that good weld spots (nuggets) 66 are formed at the weld portion.

Furthermore, as shown in FIG. 10D, the collector 64 and the truncated-cone portion of the tip 65c of the crimped portion 65b are butt-welded so that a plurality of weld spots 66 are formed so as to overlap each other along the collector 64 and the truncated-cone portion of the tip 65c of the crimped portion 65b.

If the method of forming a joint portion as described in JP-A-2008-251411 and JP-A-2010-033766 is employed as a method of forming a joint portion at a battery terminal portion or inside a battery, the internal resistance is reduced, and in addition, the electrical resistance varies less over time even under environments with frequent variations as in EVs, HEVs, PHEVs, and the like. This brings about advantages of achieving higher reliability and lower internal resistance at the joint portion at the terminal portion or inside the battery.

However, the method of forming a joint portion in this manner provides the same configuration both on the positive electrode side and on the negative electrode side, regardless of the difference in constituent material between the positive electrode side and the negative electrode side. Thus, different problems arise between the positive electrode side and the negative electrode side. For example, in nonaqueous electrolyte secondary batteries such as lithium-ion secondary batteries, an aluminum-based metal (aluminum or aluminum alloy) is generally used as a positive electrode plate substrate, and a copper-based metal (copper or copper alloy) is generally used as a negative electrode plate substrate. Thus, to prevent corrosion due to contact of different metals, in general, the positive electrode collector and the positive electrode external terminal are both formed of an aluminum-based metal, and the negative electrode collector and the negative electrode external terminal are both formed of a copper-based metal.

The aluminum-based metal has weak material strength making it difficult to ensure the joining strength only with crimping. Therefore, on the positive electrode side, it is preferable to combine crimp fixing and welding with high energy beams to ensure the joining strength and the electrical continuity. The copper-based metal has strong material strength making it possible to ensure robust joining strength only with crimping. However, it is more preferable to additionally perform welding with high energy beams as in the positive electrode side.

However, as in the examples of the related art, if the physical configuration including the crimp-fixed portion and the weld portion with high energy beams is identical on the positive electrode side and the negative electrode side, that is, the size of each part is identical, the strength of the crimp-fixed portion may be weaker on the positive electrode side than on the negative electrode side. In addition, the strength of the weld portion may be weaker on the negative electrode side than on the positive electrode side because the welding depth is large on the positive electrode side whereas the welding depth is small on the negative electrode side.

SUMMARY

An advantage of some aspects of the invention is to provide a prismatic secondary battery having an external terminal and a terminal plate that are mechanically and electrically connected by a crimped portion and by a weld portion with high energy beams, in which the joining strength between the external terminal and the terminal plate is strong both on the positive electrode side and on the negative electrode side, internal resistance variations are suppressed, and reliability is improved.

According to an aspect of the present invention, a prismatic secondary battery includes:

a prismatic outer casing having a mouth;

an electrode assembly housed inside the prismatic outer casing and having a positive electrode plate and a negative electrode plate;

a positive electrode collector electrically connected to the positive electrode plate;

a negative electrode collector electrically connected to the negative electrode plate:

a sealing body sealing the mouth of the outer casing;

a positive electrode external terminal containing an aluminum-based metal and a negative electrode external terminal containing a copper-based metal, each inserted into a through-hole provided in the sealing body while being electrically insulated from the sealing body with an insulating member interposed therebetween; and a positive electrode terminal plate and a negative electrode terminal plate arranged on the positive electrode external terminal and the negative electrode external terminal, respectively.

In the prismatic secondary battery, the positive electrode collector and the negative electrode collector are electrically connected to the positive electrode terminal plate and the negative electrode terminal plate, respectively.

The positive electrode terminal plate and the negative electrode terminal plate each have a through-hole having a tapered portion formed on the upper end side thereof.

The positive electrode external terminal and the negative electrode external terminal each have an upper end portion inserted into the through-holes of the positive electrode terminal plate and the negative electrode terminal plate, respectively, from the lower end side thereof. The upper end portions of the positive electrode external terminal and the negative electrode external terminal are crimped on the upper end side to be mechanically and electrically connected to the positive electrode terminal plate and the negative electrode terminal plate, respectively.

The crimped portions of the positive electrode external terminal and the negative electrode, external terminal each have a plurality of weld spots formed adjacent to the positive electrode terminal plate and the negative electrode terminal plate, respectively, by application of high energy beams.

The contact area between the positive electrode terminal plate and the crimped portion of the positive electrode external terminal is smaller than the contact area between the negative electrode terminal plate and the crimped portion of the negative electrode external terminal. In addition, the volume of the crimped portion of the positive electrode external terminal is larger than that of the crimped portion of the negative electrode external terminal.

In the prismatic secondary battery, the external terminal and the terminal plate are connected together by both crimp fixing and welding with high energy beams both on the positive electrode side and on the negative electrode side. Therefore, the joining strength between the external terminal and the terminal plate is strong, and good electrical continuity can be ensured. In the prismatic secondary battery, the positive electrode terminal plate and the negative electrode terminal plate for fixing bus bars or wirings by bolt fastening, welding, or other methods are provided on the positive electrode external terminal and the negative electrode external terminal, respectively, in order to connect a plurality of prismatic secondary batteries in series or in parallel. When a bus bar or wiring is fixed to the positive electrode terminal plate or the negative electrode terminal plate, stress may be exerted on the weld spot via the positive electrode plate or the negative electrode plate to cause a crack in the weld spot. In general, an aluminum-based metal is used on the positive electrode side, and a copper-based metal is used on the negative electrode side. When the weld spots having the same diameter are compared with each other, the welding depth of the weld spot on the negative electrode side cannot be ensured to be as large as that of the weld spot on the positive electrode side. Thus, the torque strength is inferior in the weld spot on the negative electrode side as compared to on the positive electrode side. In the prismatic secondary battery according to an aspect of the invention, the contact area between the negative electrode terminal plate and the negative electrode external terminal is increased by setting the crimp diameter greater on the negative electrode side than on the positive electrode side, thereby ensuring torque strength that is as large as on the positive electrode side.

The volume of the crimped portion of the external terminal has a correlation to the strength of the crimped portion. An increased load during crimping puts a load on the sealing plate, which increases the possibility that the connection portion between the sealing plate and the prismatic outer casing is damaged and that other components such as the pressure-sensitive current interruption mechanism are deformed or cracked. In the prismatic secondary battery according to an aspect of the invention, the volume of the crimped portion varies between the positive electrode side and the negative electrode side, thereby ensuring that the strength of the crimped portions is appropriate for the materials used. Therefore, in the prismatic secondary battery according to an aspect of the invention, the strength and the torque strength of the crimped portion between the external terminal and the terminal plate are strong. Thus, a highly reliable prismatic secondary battery with low internal resistance can be obtained without having adverse effects on other components.

In the prismatic secondary battery, it is preferable that the contact area between the positive electrode terminal plate and the crimped portion of the positive electrode external terminal be not less than 4.0 mm$^2$ and not more than 20.0 mm$^2$, and the volume of the crimped portion of the positive electrode external terminal be not less than 3.0 mm$^3$ and not more than 25.0 mm$^3$. In addition, it is preferable that the contact area between the negative electrode terminal plate and the crimped portion of the negative electrode external terminal be not less than 7.0 mm$^2$ and not more than 30.0 mm$^2$, and the volume of the crimped portion of the negative electrode external terminal be not less than 2.5 mm$^3$ and not more than 20.0 mm$^3$.

When the contact area between the terminal plate and the crimped portion of the external terminal and the volume of the crimped portion of the external terminal are kept in the ranges described above both on the positive electrode side and on the negative electrode side, a highly reliable prismatic secondary battery can be obtained, which has excellent strength in the crimped portion and the weld spot, and has excellent torque strength between the terminal plate and the external terminal. More preferably, the contact area between the positive electrode terminal plate and the crimped portion of the positive electrode external terminal is not less than 7.0 mm$^2$ and not more than 13.0 mm$^2$, the volume of the crimped portion of the positive electrode external terminal is not less than 3.0 mm$^3$ and not more than 11.0 mm$^3$, the contact area between the negative electrode terminal plate and the crimped portion of the negative electrode external terminal is not less than 14.0 mm$^2$ and not snore than 22.0 mm$^2$, and the volume of the crimped portion of the negative electrode external terminal is not less than 2.5 mm$^3$ and not more than 10.0 mm$^3$.

In the prismatic secondary battery, it is preferable that the shape of the crimped portions of the positive electrode external terminal and the negative electrode external terminal is annular. In this case, it is preferable that the crimped portions of the positive electrode external terminal and the negative electrode external terminal be each formed by deforming a cylindrical member by spinning crimping.

When the shape of the crimped portion is annular, an external force applied to the crimped portion is isotropically distributed from the center of the crimped portion, thereby increasing the strength of the crimped portion. In many cases, applying a large force to the crimped portion is avoided in order to prevent deformation at the periphery of the crimped portion. However, when a cylindrical member is spinning-crimped, robust crimp fixing can be achieved even without application of a large force.

In the prismatic secondary battery, it is preferable that the weld spots be larger on the positive electrode side than on the negative electrode side.

With such a configuration, the optimum mechanical strength and electrical continuity between the external terminal and the terminal plate can be ensured to be appropriate for the materials used, both on the positive electrode side and on the negative electrode side.

In the prismatic secondary battery, it is preferable that a plurality of weld spots be formed along the boundary of each of the crimped portions of the positive electrode external terminal and the negative electrode external terminal.

A single weld spot leads to insufficient mechanical strength and electrical conduction degree of the joint portions between the positive electrode terminal plate and the positive electrode external terminal and between the negative electrode terminal plate and the negative electrode external terminal. These can be improved by forming a plurality of weld spots. However, the portion under the force of crimping is fused if too many weld spots are formed with high energy beams, thereby reducing the force of crimping. Therefore, it is preferable that a plurality of weld spots he formed with high energy beams at the joint portions that do not overlap each other between the positive electrode terminal plate and the positive electrode external terminal, and between the negative electrode terminal plate and the negative electrode external terminal.

In the prismatic secondary battery, it is preferable that the weld spots be formed so as to be spaced from each other at regular intervals along the boundary of each of the crimped portions.

With such a configuration, uniform force is applied to the weld spots when force is applied to the crimped portion, which increases the strength of the joint portions between the positive electrode external terminal and the positive electrode terminal plate and between the negative electrode external terminal and the negative electrode terminal plate. Thus, a more reliable prismatic secondary battery can be obtained.

In the prismatic secondary battery, it is preferable that a pressure-sensitive current interruption mechanism be provided at least one of between the positive electrode collector and the positive electrode external terminal and between the negative electrode collector and the negative electrode external terminal.

With such a configuration, when the pressure inside the outer casing exceeds a particular level, the current interruption mechanism is brought into operation to prevent current from flowing to the outside. Thus, a safety prismatic secondary battery can be obtained.

In the prismatic secondary battery, the electrode assembly may be a flattened electrode assembly that has a plurality of stacked positive electrode substrate exposed portions at one end, and a plurality of stacked negative electrode substrate exposed portions at the other end. In the electrode assembly, the positive electrode substrate exposed portions are disposed so as to face one sidewall of the prismatic outer casing. In addition, the negative electrode substrate exposed portions are disposed so as to face the other sidewall of the prismatic outer casing. Furthermore, the positive electrode collector is connected to the positive electrode substrate exposed portions, and the negative electrode collector is connected to the negative electrode substrate exposed portions.

When the positive electrode exposed portions are disposed at one end of the prismatic outer casing and the negative electrode exposed portions at the other end, the distance between the positive electrode collector and the negative electrode collector can be enlarged, and so the prismatic secondary battery can be rendered high-capacity and assembly of the prismatic secondary battery will be facilitated. In addition, with such prismatic secondary battery of the invention, the collector will be connected to the exposed portions of the stacked substrates, and so a battery with superior output characteristics will be obtained.

BRIEF DESCRIPTION OF THE DRAWINGS

The invention will be described with reference to the accompanying drawings, wherein like numbers reference like elements.

FIG. 8A is a plan view showing the positive electrode external terminal inserted in a through-hole of the positive electrode terminal plate, FIG. 8B is a sectional view along a line VIIIB-VIIIB in FIG. 8A, FIG. 8C is a plan view showing a state in which spinning crimping is performed, FIG. 8D is a sectional view along a line VIIID-VIIID in FIG. 8C, FIG. 8E is a plan view after laser welding, and FIG. 8F is a sectional view along a line VIIIF-VIIIF in FIG. 8E.

FIG. 9A is a partial enlarged view showing a state in which a crimped portion remains in a tapered portion, and FIG. 9B is a partial enlarged view showing a state in which the crimped portion reaches a flat portion.

DESCRIPTION OF EXEMPLARY EMBODIMENTS

Figure 1A:
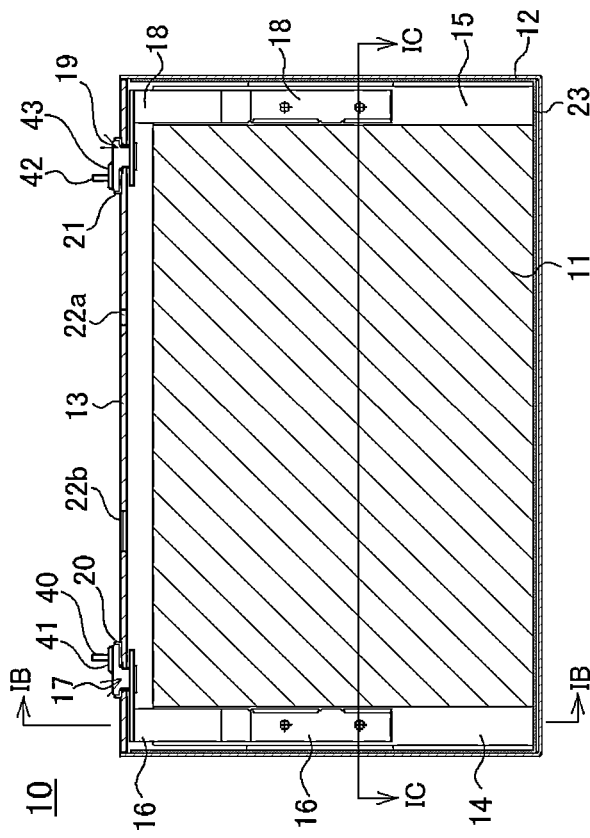
FIG. 1A is a sectional view of a prismatic nonaqueous electrolyte secondary battery according to an embodiment.

An embodiment for carrying out the invention will be described in details below with reference to the drawings. The embodiment illustrated below is intended as an illustrative example of a prismatic nonaqueous electrolyte secondary battery as a prismatic secondary battery, for the purpose of understanding the technical concept of the invention, and is not intended to limit the invention to this prismatic nonaqueous electrolyte secondary battery. The invention is equally applicable to variants without departing from the technical concept shown in the claims. It should be noted that a flattened wound electrode assembly is representatively illustrated below although the embodiment of the invention can be applied to the prismatic secondary battery having a flattened electrode assembly produced by stacking or by winding positive electrode plate(s) and negative electrode plate(s) together with separators interposed. In the embodiment of the invention, laser beams will be representatively described below although either laser beams or electronic beams can be used as high energy beams used in welding.

In the drawings for use in the description in this specification, the components are displayed on different scales and are not displayed in proportion to the actual size for the purpose of sizing components so as to be recognized in the drawings. In the specification of this application, "upper" and "lower" are referred to with respect to the electrode assembly and the sealing body. The direction from the electrode assembly side to the sealing body side is represented by "upper," and the direction from the sealing body side to the electrode assembly side is represented by "lower."

Embodiment

The prismatic nonaqueous electrolyte secondary battery of the embodiment will be described using FIGS. 1 to 5. First, the prismatic nonaqueous electrolyte secondary battery 10 of the embodiment will be described using FIGS. 1 and 2.

The prismatic nonaqueous electrolyte secondary battery 10 of the embodiment has a flattened wound electrode assembly 11 in which a positive electrode plate and a negative electrode plate are wound together with separators (all omitted from the drawings) interposed. To fabricate the positive electrode plate, a positive electrode active material mixture is spread over both sides of a positive electrode substrate of aluminum foil, and the resulting object is dried and rolled, then is slit at one end so that the aluminum foil is exposed in strips aligned in the lengthwise direction. To fabricate the negative electrode plate, a negative electrode active material mixture is spread over both sides of a negative electrode substrate of copper foil, and the resulting object is dried and rolled, then is slit at one end so that the copper foil is exposed in strips aligned in the lengthwise direction.

The positive electrode plate and the negative electrode plate obtained in the foregoing manner are then wound together with polyethylene microporous separators interposed therebetween in a state in which neither the aluminum foil exposed portions of the positive electrode plate nor the copper foil exposed portions of the negative electrode plate overlap with the active material layer of their opposing electrode, thereby fabricating a flattened wound electrode assembly 11 that includes, at one end of the winding axis, a plurality of positive electrode substrate exposed portions 14 that are stacked, and at the other end, a plurality of negative electrode substrate exposed portions 15 that are stacked.

A plurality of positive electrode substrate exposed portions 14 are stacked together and electrically connected to a positive electrode external terminal 17 with a positive electrode collector 16 interposed therebetween. Likewise, the negative electrode substrate exposed portions 15 are stacked together and electrically connected to a negative electrode external terminal 19 with a negative electrode collector 18 interposed therebetween. The positive electrode external terminal 17 is fixed to a sealing body 13 with an insulating member 20 interposed therebetween. A positive electrode terminal plate 41 having a bolt 40 for external connection is fixed on the positive electrode external terminal 17. Likewise, the negative electrode external terminal 19 is fixed to the sealing body 13 with an insulating member 21 interposed. A negative electrode terminal plate 43 having a bolt 42 for external connection is fixed on the negative electrode external terminal 19. The insulating member 20 and the insulating member 21 shown in FIG. 1 and FIG. 2 each are not formed of a single member but formed of a plurality of members, as described in details below.

To fabricate the prismatic nonaqueous electrolyte secondary battery 10 of the embodiment, the flattened wound electrode assembly 11 fabricated in the foregoing manner is inserted into a prismatic outer casing 12, with a resin sheet 23 interposed around the periphery except at the sealing body 13. Subsequently, the sealing body 13 is laser-welded to the mouth portion of the outer casing 12, after which nonaqueous electrolyte is poured in through an electrolyte pour hole 22a and the electrolyte pour hole 22a is sealed. The sealing body 13 has a gas escape valve 22b that opens when gas pressure is exerted that exceeds the actuation pressure for the current interruption mechanism.

Further lore, in the flattened wound electrode assembly 11 of the prismatic nonaqueous electrolyte secondary battery 10 of the embodiment, the stacked positive electrode substrate exposed portions 14 of the positive electrode plate are split into two groups, between which two intermediate conductive members 24 for the positive electrode are held. Likewise, the stacked negative electrode substrate exposed portions 15 of the negative electrode plate are split into two groups, between which two intermediate conductive members 25 for the negative electrode are held. The two positive electrode intermediate conductive members 24 and the two negative electrode intermediate conductive members 25 are held by insulative intermediate members 24p and 25p, respectively, that contains resin material.

On the outermost surface of each of the two positive electrode substrate exposed portion 14 groups, which are located at the two positive electrode intermediate conductive members 24, a positive electrode collector 16 is disposed, likewise on the outermost surface of each of the two negative electrode substrate exposed portion 15 groups, which are located at the two negative electrode intermediate conductive members 25, a negative electrode collector 18 is disposed. The positive electrode intermediate conductive members 24 contain aluminum, the same material as the positive electrode substrate. The negative electrode intermediate conductive members 25 contain copper, the same material as the negative electrode substrate. The positive electrode intermediate conductive members 24 can have a shape substantially identical to that of the negative electrode intermediate conductive members 25. The positive electrode substrate exposed portions 14 are resistance-welded both to the positive electrode collector 16 and to the positive electrode intermediate conductive members 24. Likewise, the negative electrode substrate exposed portions 15 are joined both to the negative electrode collector 18 and to the negative electrode intermediate conductive members 25 by resistance welding.

The prismatic nonaqueous electrolyte secondary battery 10 of the embodiment illustrates an example of using two positive electrode intermediate conductive members 24 and two negative electrode intermediate conductive members 25. However, it will alternatively be possible, depending on the required output of the battery, to use one each, or three or more. With a structure that uses two or more, the positive electrode intermediate conductive members 24 and the negative electrode intermediate conductive members 25 will be held by one insulative intermediate member of resin material, and so can be positioned and disposed in a stable state between the two split-up groups of substrate exposed portions.

A description will now be given to a method of resistance-welding the positive electrode intermediate conductive member 24 to the positive electrode substrate exposed portions 14 of the flattened wound electrode assembly 11 and the positive electrode collector 16, and to a method of resistance-welding the negative electrode intermediate conductive member 25 to the negative electrode substrate exposed portions 15 and the negative electrode collector 18. However, in the present embodiment, the shape of the positive electrode intermediate conductive member 24 and the shape of the negative electrode intermediate conductive member 25 can be substantially identical, and their resistance welding methods are also substantially the same. Therefore, the positive electrode plate side will he representatively illustrated below.

First, the positive electrode substrate exposed portions 14 of aluminum foil, of the flattened wound electrode assembly 11, are stacked. The stacked positive electrode substrate exposed portions 14 are split into two groups from the winding center portion outward to the two sides, and each group is bunched around a center that is the line along ¼ of the thickness of the wound electrode assembly 11. Subsequently, the positive electrode collector 16 is disposed on the outermost peripheries, and the positive electrode intermediate conductive members 24 are disposed on the inner peripheries, of the two hunches of positive electrode substrate exposed portions 14, in such a manner that the truncated cone-shaped protrusions of both of the positive electrode intermediate conductive members 24 contact against the positive electrode substrate exposed portions 14. Each bunch of aluminum foil has thickness of about 660 μm and 44 stacked substrates (for a total of 88). The items used for the positive electrode collector 16 are fabricated by punching and bend-processing, etc., a 0.8 mm-thick aluminum sheet.

Next, the flattened wound electrode assembly 11, in which the positive electrode collector 16 and the positive electrode intermediate conductive members 24 are disposed, is disposed between a pair of resistance welding electrodes, omitted from the drawings, that are disposed one above the other. Subsequently, the pair of resistance welding electrodes are brought into contact with the positive electrode collector 16, each of which is disposed on the outermost periphery of one of the two bunches of positive electrode substrate exposed portions 14. A suitable degree of pushing pressure is then applied between the pair of resistance welding electrodes, and resistance welding is performed under certain predetermined conditions. Since the protrusions of the positive electrode intermediate conductive members 24 thereby act as projections, the positive electrode collector 16 and two bunches of positive electrode substrate exposed portions 14, which have been disposed between the pair of resistance welding electrodes, heat up well and so large nuggets are formed. Consequently, the welds are of extremely high strength between the positive electrode collector 16 and the two bunches of positive electrode substrate exposed portions 14, the welds among the positive electrode substrate exposed portions 14, and the welds between the two bunches of positive electrode substrate exposed portions 14 and the positive electrode intermediate conductive members 24.

Moreover, during such resistance welding, the positive electrode intermediate conductive members 24 are disposed in a stably positioned state between the two bunches of positive electrode substrate exposed portions 14. This leads to the resistance welding in an accurate and stable state, the curbing of variation in the weld strength, and the realizing of low resistance of the welds. A prismatic secondary battery that is capable of high current cycling thus can be manufactured. By repeating such resistance welding as many times as the number of positive electrode intermediate conductive members 24 used, all of the resistance welding is executed—between the positive electrode collector 16 and the two bunches of positive electrode substrate exposed portions 14, among the positive electrode substrate exposed portions 14, and between the two bunches of positive electrode substrate exposed portions 14 and the positive electrode intermediate conductive members 24. This resistance welding is carried out in the same manner for the negative electrode.

Now will be described the pressure-sensitive current interruption mechanism that is interposed between the positive electrode collector 16 and the positive electrode external terminal 17 or between the negative electrode collector 18 and the negative electrode external terminal 19. This current interruption mechanism can be provided on the positive electrode side only, on the negative electrode side only, or on both the positive electrode and negative electrode sides. Below, the case where the mechanism is provided on the positive electrode side only is described, with reference to FIGS. 3 to 5.

Figure 1C:
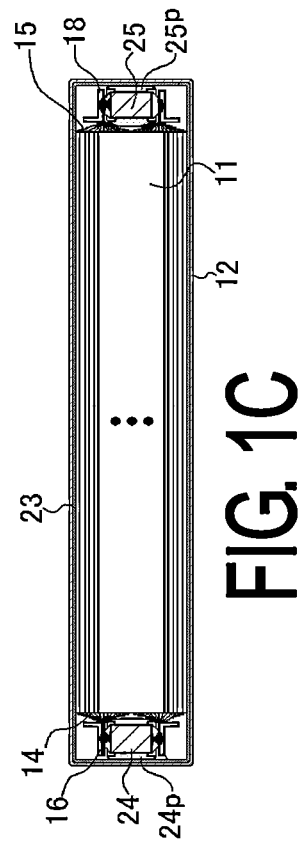
FIG. 1C is a sectional view along a line IC-1C in FIG. 1A.
Figure 1B:
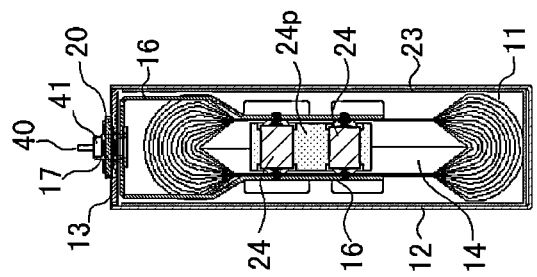
FIG. 1B is a sectional view along a line IB-IB in FIG. 1A.
Figure 2:
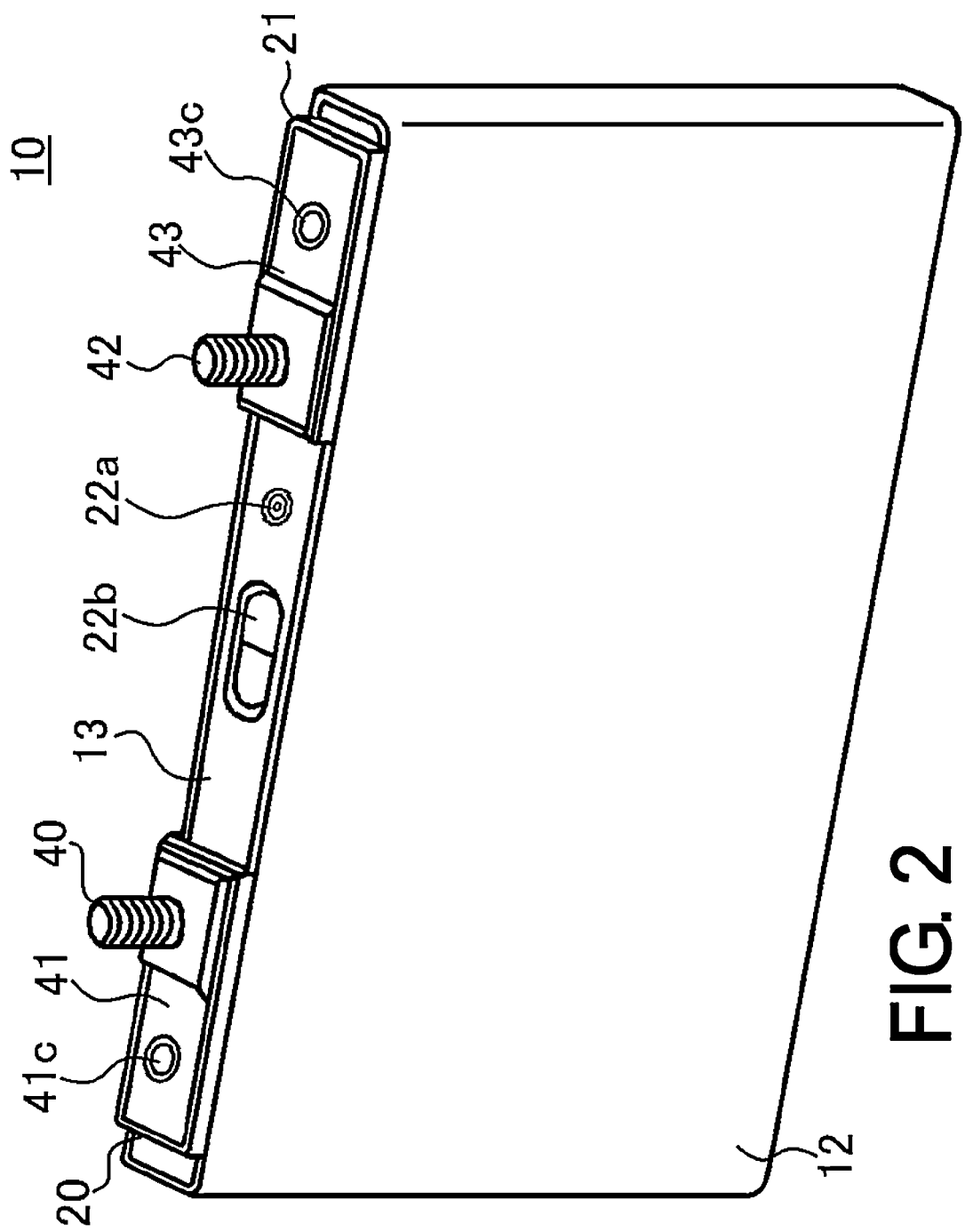
FIG. 2 is a perspective view of the prismatic nonaqueous electrolyte secondary battery shown in FIG. 1.
Figure 5A:
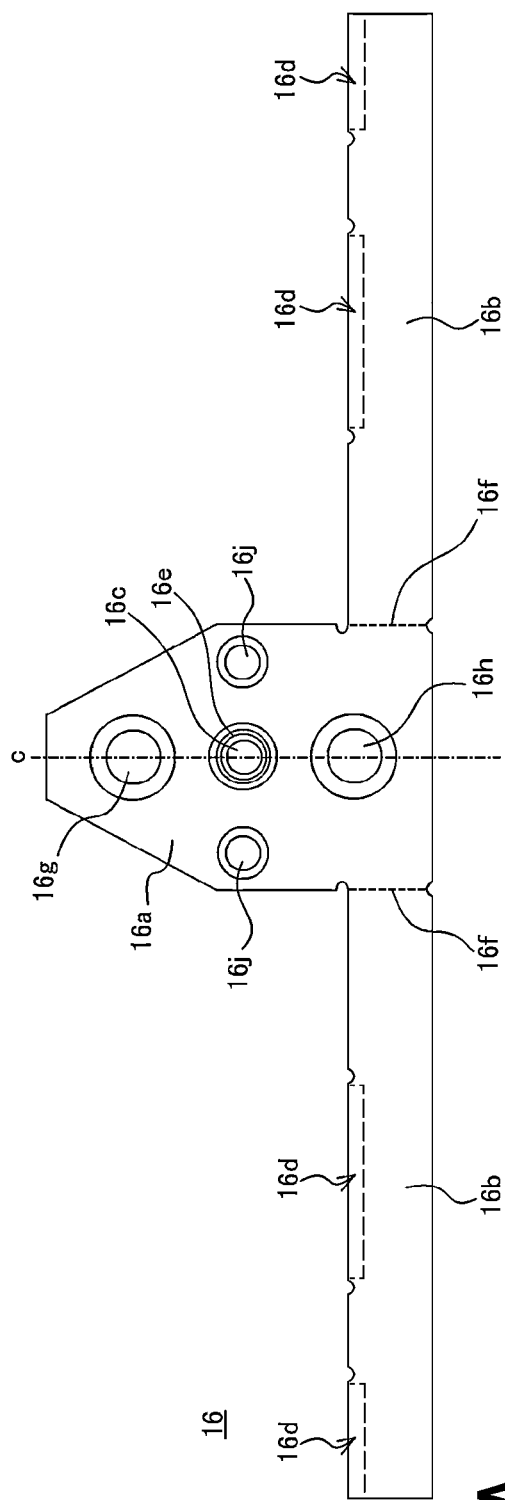
FIG. 5A is an opened-out front view and FIG. 5B is an opened-out side view of a positive electrode collector of the prismatic nonaqueous electrolyte secondary battery shown in FIG. 1.
Figure 5B:
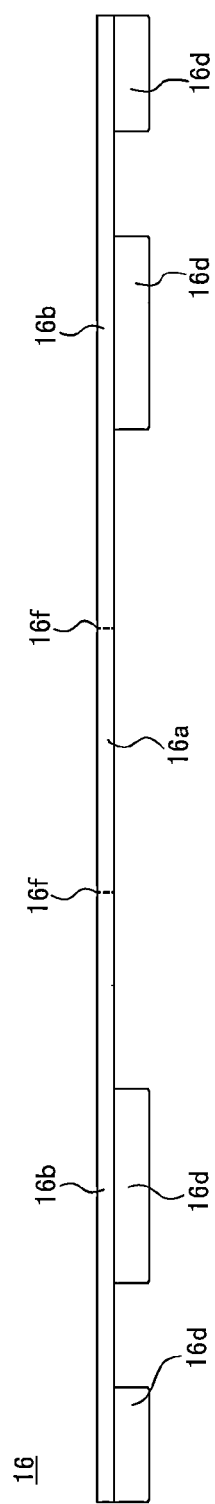

As FIGS. 1A to 1C show, the positive electrode collector 16 is connected to the positive electrode substrate exposed portions 14 disposed at one end of the wound electrode assembly 11. The positive electrode collector 16 is electrically connected to the positive electrode external terminal 17. As shown in FIGS. 5A and 5B, which are an opened-out front view and side view, respectively, positive electrode collector 16 has a first region 16a that is disposed parallel to the sealing body 13, and a pair of second regions 16b that extend outward from the first region 16a in mutually opposite directions, are folded at the dashed lines (boundaries 16f), and are connected to the positive electrode substrate exposed portions 14. The positive electrode collector 16 is fabricated by punching from aluminum sheet of thickness 0.8 mm, therefore are rigid, and cannot be folded with a small force. In FIG. 5A notched portions are formed in both of the boundaries 16f in order to facilitate folding of the positive electrode collector 16 along the boundaries 16f.

In the central portion of the first region 16a of the positive electrode collector 16, there is formed a connection forming hole 16c. On the centerline c that passes through the center of the connection forming hole 16c in the direction of the long sides of the sealing body 13 there are formed a first opening 16g and a second opening 16h, one on each side of the connection forming hole 16c. In the direction perpendicular to the centerline c, there are formed two third openings 16j, one on each side. The diameters of the first opening 16g and second opening 16h are identical. The diameters of both two third openings 16j are identical and are determined so as to be smaller than the diameters of the first opening 16g and second opening 16h. In the second regions 16b of the positive electrode collector 16, there are formed ribs 16d on the side facing toward the base portion of the positive electrode substrate exposed portions 14. These ribs 16d perform the roles of positioning the positive electrode collector 16 relative to the positive electrode substrate exposed portions 14, positioning the wound electrode assembly 11 relative to the battery outer casing 12, preventing the spatter that occurs during resistance welding of the positive electrode collector 16 to the positive electrode substrate exposed portions 14 from entering the wound electrode assembly 11, and so forth. The portion around the circumference of the connection forming hole 16c in the first region 16a is an annular thin region 16e whose thickness is smaller than those of the other portions.

Figure 3A:
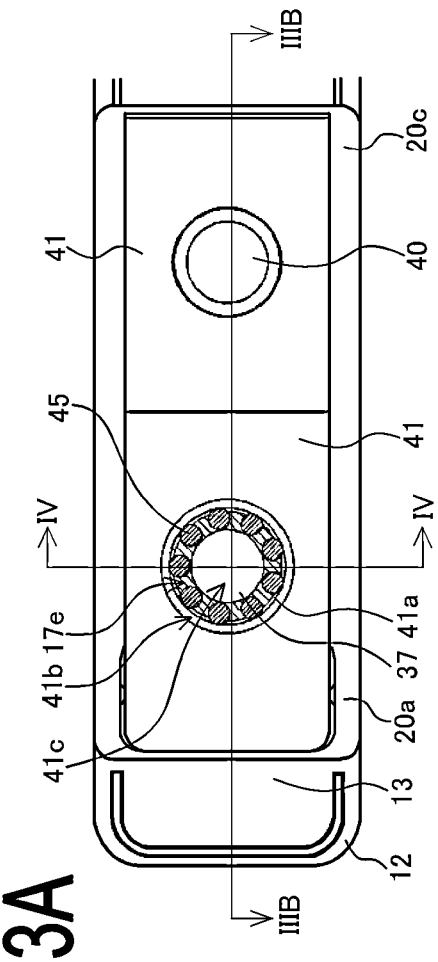
FIG. 3A is a plan view on the positive electrode side of the prismatic nonaqueous electrolyte secondary battery shown in FIG. 1.
Figure 3B:
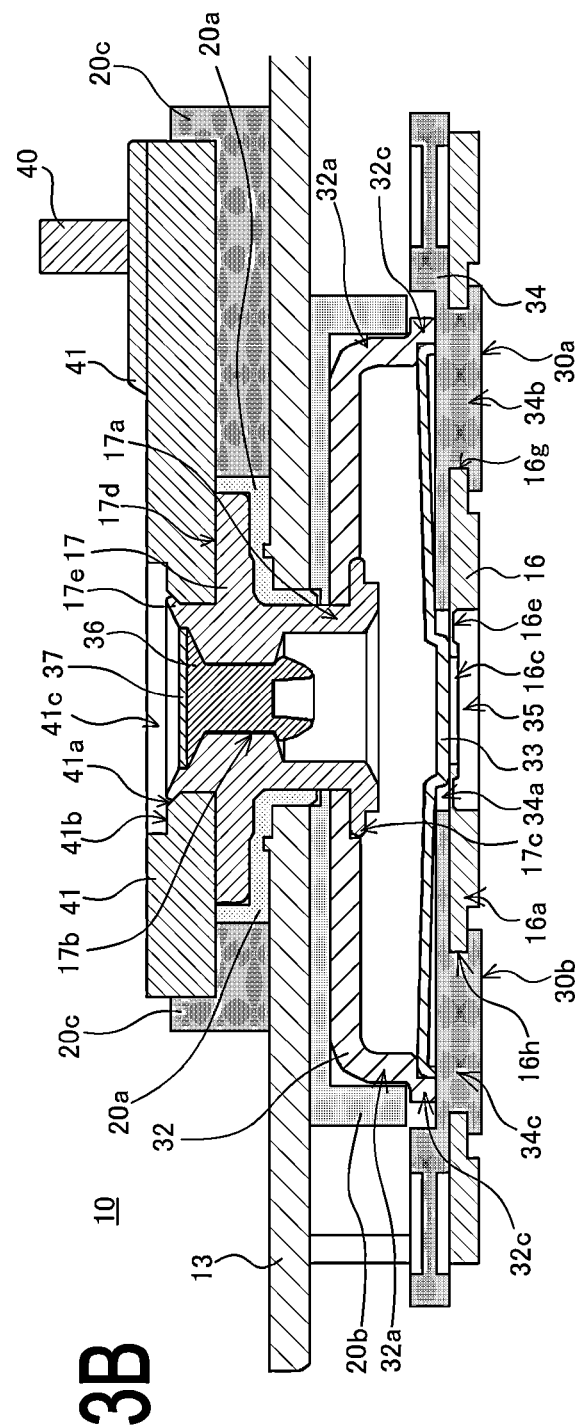
FIG. 3B is an enlarged sectional view along a line IIIB-IIIB in FIG. 3A.
Figure 4:
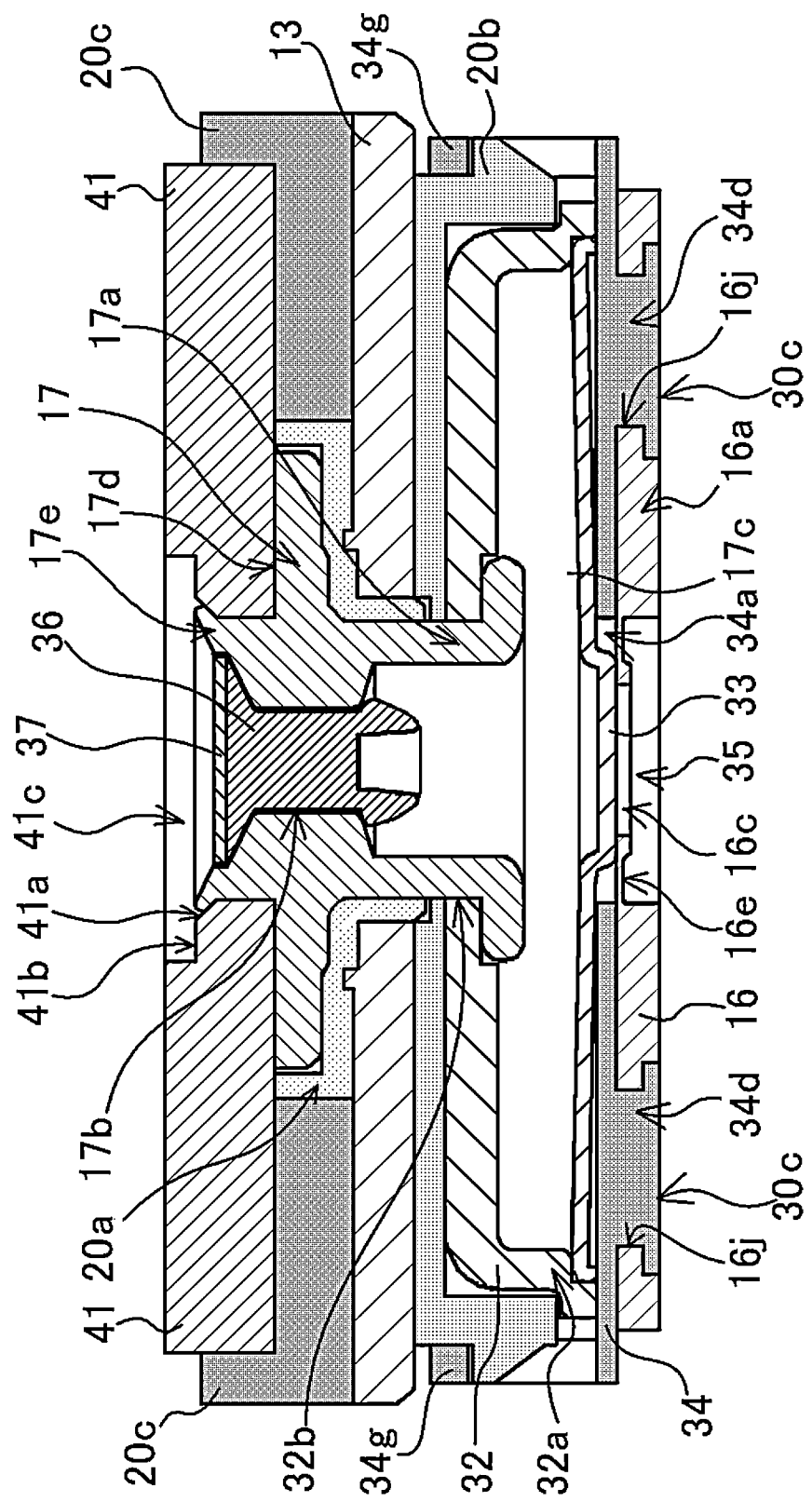
FIG. 4 is an enlarged sectional view along a line IV-IV in FIG. 3A.

The positive electrode external terminal 17, as shown in FIGS. 3 and 4, has tubular portion 17a, and a through-hole 17b formed in its interior. The tubular portion 17a of the positive electrode external terminal 17 is inserted into holes formed in an upper first insulating member 20a such as a gasket, in the sealing body 13, in a lower first insulating member 20b and in conductive member 32 having a tubular portion 32a, and the tip portions 17c are swaged and fixed so as to be mutually integrated. The conductive member 32 has a tubular portion 32a formed at its battery interior end, while at its battery exterior end—that is, sealing body 13 end, where the diameter narrows—there is formed opening 32b into which the tubular portion 17a of the positive electrode external terminal 17 is inserted. The tip portion 17c of the tubular portion 17a of the positive electrode external terminal 17 is swaged near the opening 32b in the conductive member 32, and is laser-welded to the connection portion of the conductive member 32. Thereby, the positive electrode external terminal 17 is electrically connected to the conductive member 32 in such a state as to be electrically insulated from the sealing body 13 by the upper first insulating member 20a and the lower first insulating member 20b.

The battery interior-end tip of the tubular portion 32a of the conductive member 32 is formed with a flange portion 32c. The interior-side of the flange portion 32c is hermetically welded to the periphery of an inversion plate 33. The inversion plate 33 is shaped so as to protrude slightly, from the periphery towards the center, in the direction of the battery interior—that is, shaped so as to be in a slanted positional relationship with the sealing body 13. The inversion plate 33 contains a conductive material and has the function of a valve that is deformed toward the exterior of the battery when the pressure inside the outer casing 12 increases. The first region 16a of the positive electrode collector 16 contacts against the center portion of the inversion plate 33. The inner wall portion of the connection forming hole 16c in the thin region 16e formed in the first region 16a is laser-welded at a plurality of locations to the surface of the inversion plate 33.

Furthermore, between the first region 16a of positive electrode collector 16 and the inversion plate 33, there is formed a second insulating member 34 that contains resin material and has a first through-hole 34a. The first region 16a of positive electrode collector 16 is electrically connected to the inversion plate 33 through the first through-hole 34a. Around this first through-hole 34a in the second insulating member 34, there are formed a first projection 34b in the position corresponding to the first opening 16g in the first region 16a of the positive electrode collector 16, a second projection 34c in the position corresponding to the second opening 16h and a third projection 34d in the position corresponding to the third openings 16j.

The first to third projections 34b to 34d of the second insulating member 34 are inserted into the first to third openings 16g to 16j, respectively, formed in the first region 16a of positive electrode collector 16, and by heating the tips of the first to third projections 34b to 34d to widen their diameters, the second insulating member 34 and the first region 16a of positive electrode collector 16 are fixed to each other. As a result, the first to third projections 34b to 34d of the second insulating member 34 are, thanks to the widened-diameter portions formed in each of them, prevented from falling out from the first to third openings 16g to 16j formed in the first region 16a of positive electrode collector 16, and the second insulating member 34 are robustly joined to the first region 16a of positive electrode collector 16. The first to third fixing portions 30a to 30c are formed from these first to third openings 16g to 16j formed in the first region 16a of positive electrode collector 16 and from the first to third projections 34b to 34d of the second insulating member 34. The second insulating member 34 and the lower first insulating member 20b, which constitute the first insulating member, will preferably be fixed together by engaging to each other. There is no particular restriction on such fixing method, but in this embodiment, the second insulating member 34 and the lower first insulating, member 20b constituting the first insulating member are fixed together by means of latch fixing.

Thus, the positive electrode substrate exposed portions 14 are electrically connected to the positive electrode external terminal 17 via the first and second regions 16a and 16b and thin region 16e of positive electrode collector 16, and via the inversion plate 33 and the conductive member 32. The current interruption mechanism of this embodiment is formed with the tubular portion 32a of the conductive member 32, the inversion plate 33, the second insulating member 34, and the thin region 16e that is formed in the first region 16a of positive electrode collector 16.

Specifically, the inversion plate 33 is so configured so as to swell toward the through-hole 17b in the positive electrode external terminal 17 when the pressure inside the battery outer casing 12 increases. Since the thin region 16e in the first region 16a of positive electrode collector 16 is welded to the central portion of the inversion plate 33, the first region 16a of positive electrode collector 16 fractures at the thin region 16e portion when the pressure inside the outer casing 12 exceeds a particular level. Consequently, the electrical connection between the inversion plate 33 and the first region 16a of positive electrode collector 16 is interrupted.

Thus, with the thin region 16e, first region 16a will be prone to fracture at the thin region 16e portion when the inversion plate 33 is deformed, and will reliably fracture at the thin region 16e portion when the pressure inside the battery increases. This enhances the safety of the prismatic electrolyte nonaqueous secondary battery 10. It is also possible, by determining the thickness and formation extent of the thin region 16e portion as appropriate, to set the pressure at which the thin region 16e portion fractures as the particular pressure level. This too will enhance the reliability.

An example has been described here in which the thin region 16e, which has a thickness smaller than the other portions, is formed ring-like in the portion around the periphery of the connection forming hole 16c in the first region 16a. However, it will be more preferable that, in the thin region 16e, a ring-like groove be provided so as to encircle the connection forming hole 16c. This groove may also be formed in an intermittent annular form. It is alternatively possible to form the thin region 16e by leaving the periphery portion around the connection forming hole 16c in the first region 16a with the same thickness as the other portions and forming in such periphery portion an annular or intermittent annular groove. The thin region 16e and groove are not essential structural elements. It will alternatively be possible, without providing the thin region 16e or groove, to adjust the strength of the connections between the inversion plate 33 and positive electrode collector 16 so that such connections will be broken if the inversion plate 33 is deformed.

The through-hole 17b on the top of the positive electrode external terminal 17 is used for testing whether the periphery of the inversion plate 33 included in the current interruption mechanism 35 is hermetically welded, and may be used in an unchanged state. However, if corrosive gas or liquid enters the inside of through-hole 17b and corrodes the inversion plate 33, the current interruption mechanism 35 may cease to operate normally. Therefore, the through-hole 17b of the positive electrode external terminal 17 is preferably sealed. In the prismatic nonaqueous electrolyte secondary battery 10 of the embodiment, the through-hole 17b formed in the positive electrode external terminal 17 is robustly sealed by fitting a terminal plug 36 therein and by welding the periphery of a metallic plate 37 of an aluminum-based metal that is provided on the upper portion of the terminal plug 36. This terminal plug 36 used may be an object containing an elastic material or a resin material without a metallic plate on the upper portion thereof.

Furthermore, in the prismatic nonaqueous electrolyte secondary battery 10 of the embodiment, the space in the current interruption mechanism 35 that corresponds to the exterior is completely sealed. But even if the pressure inside the outer casing 12 increases due to some cause, the pressure of the gases produced inside the battery will become extremely high during abnormality, and there will be no simultaneous similar increase in the pressure inside the sealed space in the current interruption mechanism 35 adjacent to the exterior of the battery. Thus, the space adjacent to the battery exterior being sealed will pose no problem for actuation of the current interruption mechanism 35.

A specific configuration of the joint portion between the positive electrode external terminal 17 and the positive electrode terminal plate 41 will now be described with reference to FIG. 3, FIG. 4, and FIG. 7 to FIG. 9. FIG. 8 and FIG. 9 are schematic views each for explaining a joint state between the external terminal and the terminal plate. Those views are not necessarily precise and portions that may be unnecessary for understanding are not shown.

The positive electrode external terminal 17 has a flat shoulder portion 17d and a crimped portion 17e formed at the rapper portion thereof. The crimped portion 17e has a cylindrical shape before crimping and has the through-hole 17b inside thereof in communication with a tubular portion 17a, In the following description, the crimped portion before crimping is also denoted by the reference sign "17e," A positive electrode terminal plate 41 rests on the flat shoulder portion 17d of the positive electrode external terminal 17. A third insulating member 20c is arranged at the lower portion of the periphery of the positive electrode terminal plate 41 so as to ensure electrical insulation from the sealing body 13. In other words, the insulating member 20 in FIG. 1 and FIG. 2 collectively show the upper first insulating member 20a, the lower first insulating member 20b, and the third insulating member 20c. The positive electrode terminal plate 41 has a through-hole 41c in which a tapered portion 41a having a diameter increasing upward and a flat portion 41b are formed. The positive electrode terminal plate 41 also has a bolt 40 provided to stand on the upper surface thereof at a position where the through-hole 41c is not formed. This bolt 40 is provided to fix a bus bar for connecting a plurality of prismatic nonaqueous secondary batteries 10 in series or in parallel, wiring for external connection, and so forth, with a bolt (not shown). The cylindrical crimped portion 17e of the positive electrode external terminal 17 is inserted through the through-hole 41c of the positive electrode terminal plate 41 from the lower side, and the lower surface of the positive electrode terminal plate 41 rests on the shoulder portion 17d of the positive electrode external terminal 17. In this state, the cylindrical crimped portion 17e of the positive electrode external terminal 17 is crimped, thereby fixing the positive electrode terminal plate 41 and the positive electrode external terminal 17 robustly together.

Figure 7:
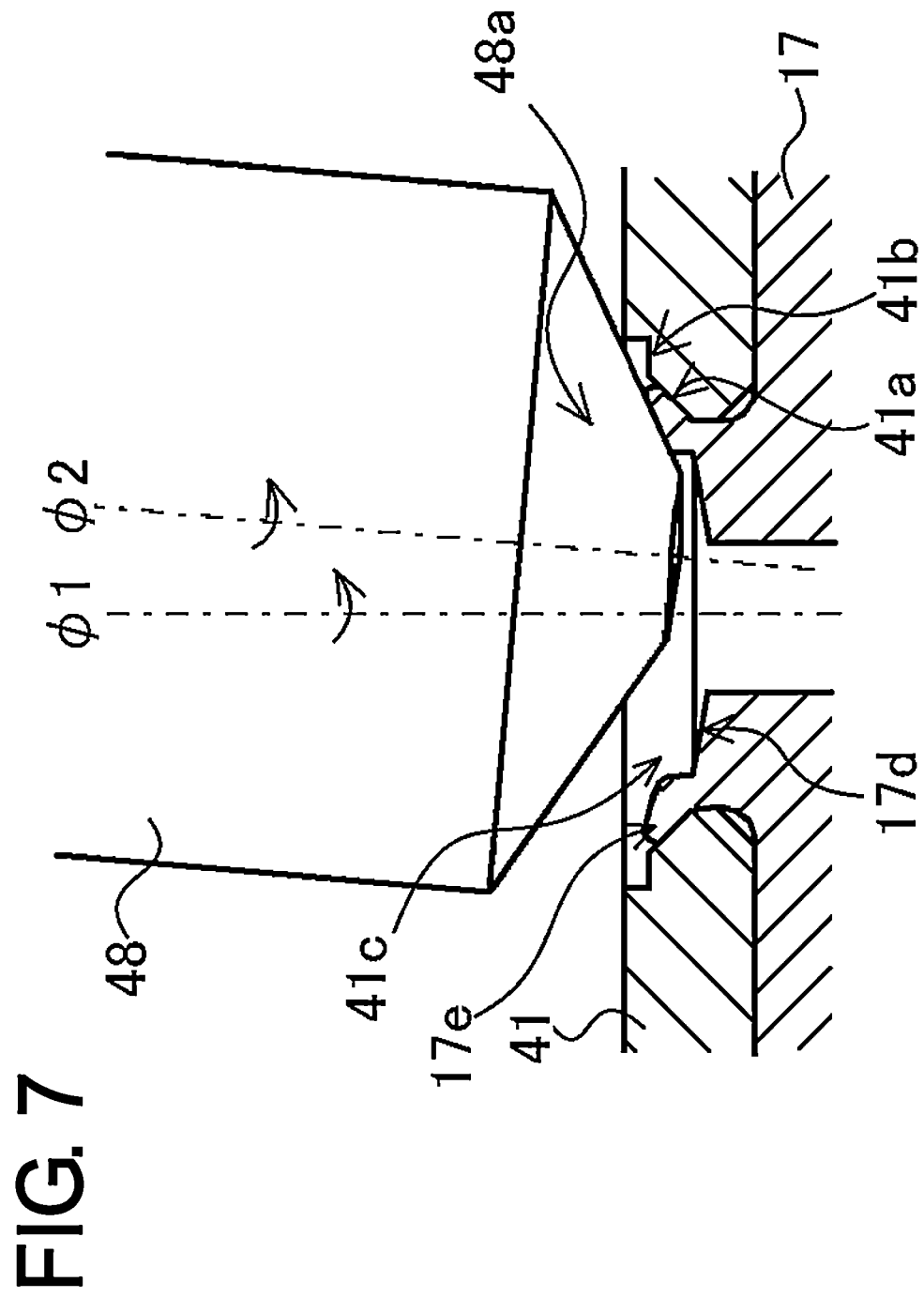
FIG. 7 is a sectional view showing a state in which a positive electrode external terminal is crimp-fixed to a positive electrode terminal plate by spinning crimping.
Figure 10A:
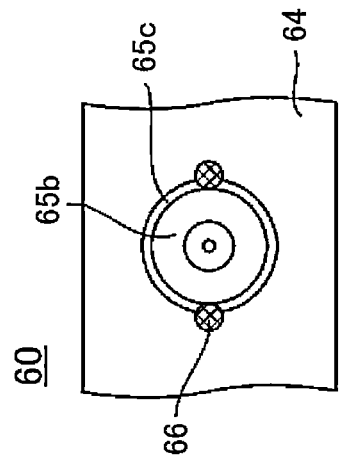
FIG. 10A is a sectional view showing a step of processing a tip of a crimped portion of a terminal in the related art.
Figure 10C:
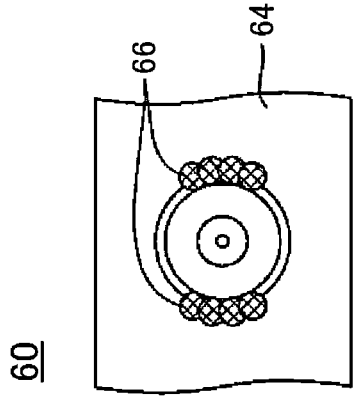
FIG. 10C is a plan view of FIG. 10B.
Figure 10B:
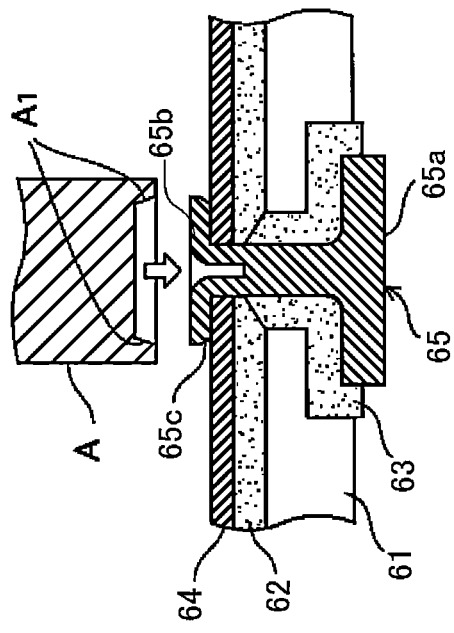
FIG. 10B shows a step of laser welding after the step in FIG. 10A.
Figure 10D:
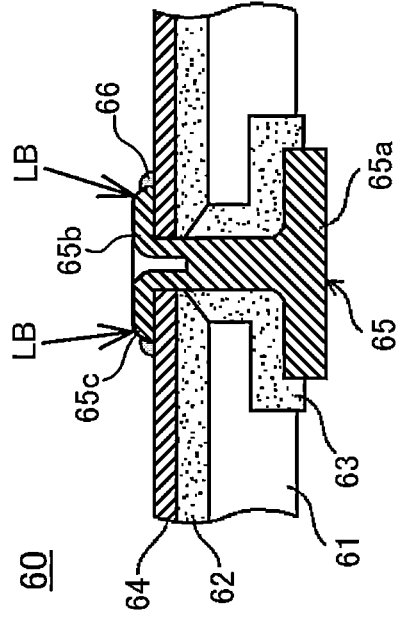
FIG. 10D is a plan view showing a state after laser welding is repeated a plurality of times so that a plurality of weld spots overlap each other.

The crimped portion 17e of the positive electrode external terminal 17 is fixed to the through-hole 41c of the positive electrode terminal plate 41 by spinning crimping in the following manner. First, the cylindrical crimped portion 17e of the positive electrode external terminal 17 is inserted into the through-hole 41c of the positive electrode terminal plate 41 from the lower side, which leads to the state as shown in FIG. 8A and FIG. 8B. In this state, as shown in FIG. 7, spinning crimping is performed using a spinning crimping jig 48 so as to increase the diameter of the cylindrical crimped portion 17e from the upper side. The spinning crimping jig 48 has a tip portion 48a processed so that its diameter is reduced. The spinning crimping jig 48 is driven to rotate around a center axis $\phi 1$ of the cylindrical crimped portion 17e while rotating around an axis $\phi 2$ eccentric with respect to the center axis $\phi 1$ of the cylindrical crimped portion 17e. Thus, the tip side of the cylindrical crimped portion 17e has the diameter increased to be crimp-fixed to the surface of the tapered portion 41a of the positive electrode terminal plate 41, which leads to the state shown in FIG. 8C and FIG. 8D.

With this spinning crimping, the tip side of the cylindrical crimped portion 17e of the positive electrode external terminal 17 can be robustly crimp-fixed to the surface of the tapered portion 41a of the positive electrode terminal plate 41 even without applying a large force. Consequently, the sealing body 13, the upper first insulting member 20a, the lower first insulating member 20b, and the current interruption mechanism 35 are not subjected to a large force and are thus less likely to be deformed or broken. Furthermore, in the nonaqueous electrolyte secondary battery 10 of the embodiment, as shown in FIG. 8E and FIG. 8F, the crimped portion 17e of the positive electrode external terminal 17 and the tapered portion 41a of the positive electrode terminal plate 41 are laser-welded together at a plurality of places, so that weld spots 45 are formed at a plurality of places at regular intervals.

A specific configuration of the joint portion between the negative electrode collector 18 and the negative electrode external terminal 19 and the joint portion between the negative electrode external terminal 19 and the negative electrode terminal plate 43 will be described with reference to FIG. 6. The specific configuration of the negative electrode collector 18 is substantially identical to that of the positive electrode collector 16 shown in FIG. 5 except that the material is a copper-based metal, and therefore a detailed description thereof will be omitted. A pressure-sensitive current interruption mechanism is not formed on the negative electrode side, and the negative electrode external terminal 19 is fixed to the sealing body 13 while being electrically insulated from the sealing body 13 with the upper first insulating member 21a and the lower first insulating member 21b.

The negative electrode collector 18 has a connection forming hole 18c formed therein. A lower tip portion 19c of the negative electrode external terminal 19 is inserted into the connection forming hole 18c and is thereafter crimp-fixed thereto, thereby integrally joining the negative electrode collector 18 and the negative electrode external terminal 19. The connection portion between the lower tip portion 19c of the negative electrode external terminal 19 and the negative electrode collector 18 are laser-welded, The negative electrode external terminal 19 has a flat shoulder portion 19d and a crimped portion 19e formed at the upper portion thereof in a similar manner as in the positive electrode external terminal 17. The negative electrode terminal plate 43 rests on the flat shoulder portion 19d of the negative electrode external terminal 19. A third insulating member 21c is arranged at the lower portion of the periphery of the negative electrode terminal plate 43 so as to ensure electrical insulation from the sealing body 13. In other words, the insulating member 21 on the negative electrode side in FIG. 1 and FIG. 2 collectively show the upper first insulating member 21a, the lower first insulating member 21b, and the third insulating member 21c. The crimped portion 19e has a cylindrical shape before crimping. However, unlike the positive electrode external terminal 17, the crimped portion 19e has no through-hole formed inside because a pressure-sensitive current interruption mechanism is not provided on the negative electrode side.

The negative electrode terminal plate 43 has a through hole 43c in which a tapered portion 43a having a diameter increasing upward and a flat portion 43b are formed. The negative electrode terminal plate 43 also has a bolt 42 provided to stand on the upper surface thereof at a position where the through-hole 43c is not formed. The cylindrical crimped portion 19e of the negative electrode external terminal 19 is inserted into the through-hole 43c of the negative electrode terminal plate 43 from the lower side, and the lower surface of the negative electrode terminal plate 43 rests on the shoulder portion 19d of the negative electrode external terminal 19. In this state, the cylindrical crimped portion 19e of the negative electrode external terminal 19 is crimped, thereby fixing the negative electrode terminal plate 43 and the negative electrode external terminal 19 robustly together.

The crimped portion 19e of the negative electrode external terminal 19 is fixed to the through-hole 43c of the negative electrode terminal plate 43 by spinning crimping in a similar manner as in the positive electrode side. In addition, the crimped portion 19e of the negative electrode external terminal 19 and the tapered portion 43a of the negative electrode terminal plate 43 are laser-welded together at a plurality of places, so that weld spots 46 are formed at a plurality of places at regular intervals.

Figure 6A:
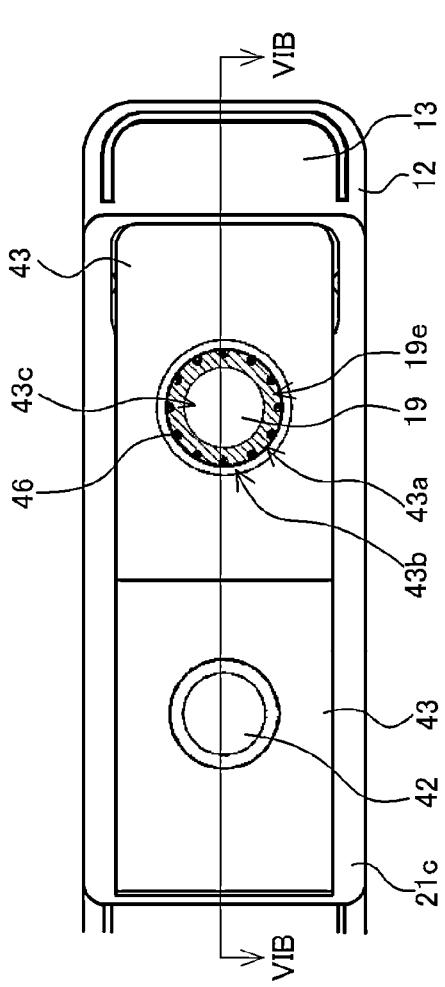
FIG. 6A is a plan view on the negative electrode side of the prismatic nonaqueous electrolyte secondary battery shown in FIG. 1.
Figure 6B:
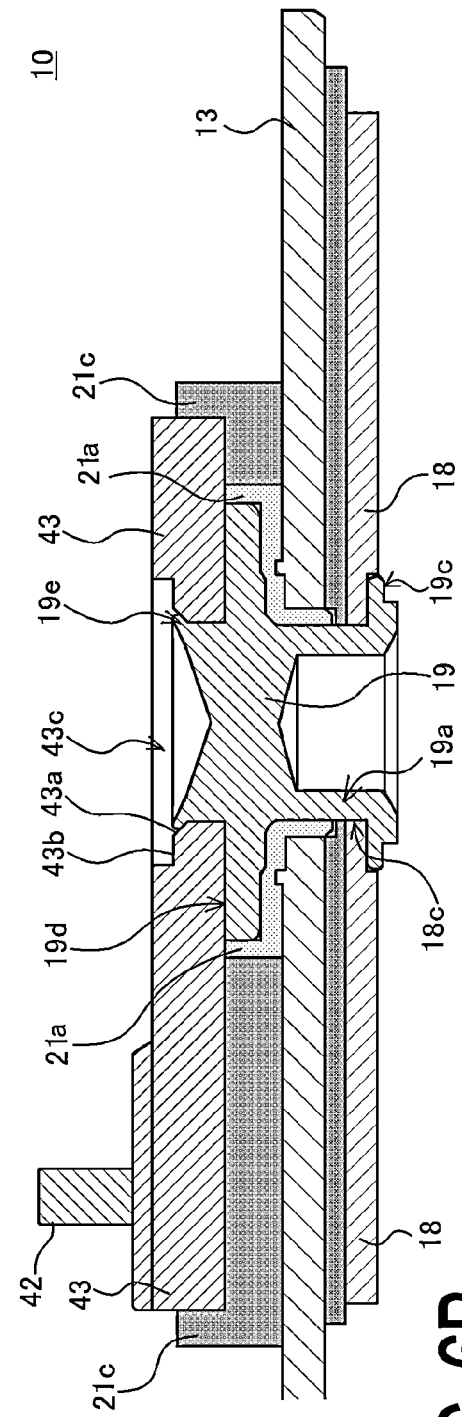
FIG. 6B is an enlarged sectional view along a line VIB-VIB in FIG. 6A.

A description will now he given to the contact states between the crimped portion 17e of the positive electrode external terminal and the terminal plate 41 and between the crimped portion 19e of the negative electrode external terminal and the terminal plate 43, the sizes of the weld spots 45 and 46, or other configurations, with reference to FIG. 3A, FIG. 6A, and FIG. 9. FIG. 9A is a partial enlarged view showing a state in which the crimped portion remains in the tapered portion, and FIG. 9B is a partial enlarged view showing a state in which the crimped portion reaches the flat portion.

In a nonaqueous electrolyte secondary battery, an aluminum-based metal is generally used as a substrate of the positive electrode plate. Therefore, to prevent corrosion due to contact between different metals, it is preferable that the positive electrode collector 16, the pressure-sensitive current interruption mechanism 35, the positive electrode external terminal 17, and the positive electrode terminal plate 41 also contain an aluminum-based metal. Likewise, a copper-based metal is generally used for the substrate of the negative electrode plate, and it is therefore preferable that the negative electrode collector 18, the negative electrode external terminal 19, and the negative electrode terminal plate 43 also contain a copper-based metal.

In the nonaqueous electrolyte secondary battery 10 of the embodiment, the bolts 40 and 42 for fixing bus bars or wirings by bolting are provided on the positive electrode terminal plate 41 and the negative electrode terminal plate 43, respectively, in order to connect a plurality of batteries in series or in parallel. When bus bars or wirings are fixed to the positive electrode terminal plate 41 and the negative electrode terminal plate 43 by bolting, torque stress may be exerted on the weld spots 45 and 46 via the positive electrode external terminal and the negative electrode external terminal, respectively, to cause a crack in the weld spots 45 and 46.

A copper-based metal has a property of poorer weld efficiency with high energy beams, such as laser welding, than an aluminum-based metal due to having good heat conductivity and higher reflectivity than an aluminum-based metal. Therefore, with weld spots having the same diameter, the welding depth in the weld spot 46 on the negative electrode side using a copper-based metal is not ensured to be as deep as in the weld spot 45 on the positive electrode side using an aluminum-based metal. Therefore, the weld spot 46 on the negative electrode side is inferior in torque strength. The volume of the crimped portions 17e and 19e of the positive electrode external terminal 17 and the negative electrode external terminal 19 has correlation to the strength of the crimped portions 17e and 19e, respectively. Merely increasing the strength of the crimped portions 17e and 19e may increase the volume of the crimped portion 17e and 19e. However, an increased load during crimping causes a load on the sealing plate 13 and other components, which increases the possibility that the weld portion between the sealing plate 13 and the battery outer casing 12 is damaged and that the current interruption mechanism 35 is deformed or cracked. Therefore, partly because of size limitation in attachment, the volume of the crimped portions 17e and 19e cannot be unnecessarily increased.

In the nonaqueous electrolyte secondary battery of the embodiment, the crimp diameter on the negative electrode side is set larger than that on the positive electrode side, and the contact area between the negative electrode terminal plate 43 and the crimped portion 19e of the negative electrode external terminal 19 is set larger than the contact area between the positive electrode terminal plate 41 and the crimped portion 17e of the positive electrode external terminal 17, thereby ensuring that the torque strength is as large as on the positive electrode side. Furthermore, the volume of the crimped portion 17e of the positive electrode external terminal 17 is set larger than the volume of the crimped portion 19e of the negative electrode external terminal 19, thereby ensuring that the strength of the crimped portion is as large as on the negative-electrode side. The volume of the crimped portion 19e of the negative electrode external terminal 19 using a copper-based metal with high strength is set smaller than the volume of the crimped portion 17e of the positive electrode external terminal 17 using an aluminum-based metal, thereby eliminating the need for increasing the load during crimping.

In this specification, as shown in FIG. 9A and FIG. 9B, the contact area between the positive electrode terminal plate 41 and the crimped portion 17e of the positive electrode external terminal 17 or the contact area between the negative electrode terminal plate 43 and the crimped portion 19e of the negative electrode external terminal 19 refers to the contact area above a line L indicating the lower end of the tapered portion 41a of the positive electrode terminal plate 41 or the tapered portion 43a of the negative electrode terminal plate 43. The contact areas at the flat portions 41b and 43b are also included when, as shown in FIG. 9B, the crimped portions 17e and 19e reach the flat portions 41b and 43b beyond the tapered portions 41a and 43a, respectively. Likewise, the volume of the crimped portion 17e of the positive electrode external terminal 17 or the volume of the crimped portion 19e of the negative electrode external terminal 19 indicates the volume above the line L and includes the volume of the flat portion 41b or 43b.

According to the results of various experiments, a highly reliable prismatic secondary battery with low internal resistance can be obtained, which is excellent in the strength of the crimped portions 17e and 19e, the strength of the weld spots 45 and 46, the torque strength between the positive electrode terminal plate 41 and the crimped portion 17e of the positive electrode external terminal 17, and the torque strength between the negative electrode terminal plate 43 and the crimped portion 19e of the negative electrode external terminal 19, without having adverse effects on other components, when, specifically, the contact area between the positive electrode terminal plate 41 and the crimped portion 17e of the positive electrode external terminal 17 is not less than 4.0 mm$^2$ and not more than 20.0 mm$^2$, the volume of the crimped portion 17e of the positive electrode external terminal 17 is not less than 3.0 mm$^3$ and not more than 25.0 mm$^3$, the contact area between the negative electrode terminal plate 43 and the crimped portion 19e of the negative electrode external terminal 19 is not less than 7.0 mm$^2$ and not more than 30.0 mm$^2$, and the volume of the crimped portion 19e of the negative electrode external terminal 19 is not less than 2.5 mm$^3$ and not more than 20.0 mm$^3$.

More preferably, the contact area between the positive electrode terminal plate 41 and the crimped portion 17e of the positive electrode external terminal 17 is not less than 7.0 mm$^2$ and not more than 13.0 mm$^2$, the volume of the crimped portion 17e of the positive electrode external terminal 17 is not less than 3.0 mm$^3$ and not more than 11.0 mm$^3$, the contact area between the negative electrode terminal plate 43 and the crimped portion 19e of the negative electrode external terminal 19 is not less than 14.0 mm$^2$ and not more than 22.0 mm$^2$, and the volume of the crimped portion 19e of the negative electrode external terminal 19 is not less than 2.5 mm$^3$ and not more than 10.0 mm$^3$.

In the prismatic secondary battery 10 in the foregoing embodiment, the weld spots 45 and 46 are formed at the boundary portion between the positive electrode terminal plate 41 and the crimped portion 17e of the positive electrode external terminal 17, and at the boundary portion between the negative electrode terminal plate 43 and the crimped portion 19e of the negative electrode external terminal 19, respectively. The diameter of the weld spot 46 on the negative electrode side is preferably smaller than the weld spot 45 on the positive electrode side.

On the positive electrode side using an aluminum-based metal, the strength may not be enough only with crimp fixing; however, the formation of large weld spots 45 in addition to crimp fixing can ensure strength and good electrical continuity. In contrast, the strength is enough only with crimp fixing on the negative electrode side using the copper-based metal, whereas a copper-based metal requires larger energy during welding than an aluminum-based metal and therefore may easily cause spatters or cracks. On this negative electrode side, spatters or cracks are prevented by reducing the diameter of the weld spot 46, and good electrical continuity can be ensured by preventing variations in internal resistance due to vibrations and so forth. Therefore, in the prismatic nonaqueous electrolyte secondary battery 10 of the embodiment, the joining strength between the external terminal and the terminal plate is strong both on the positive electrode side and on the negative electrode side, and internal resistance variations are suppressed. Thus, a prismatic nonaqueous electrolyte secondary battery with improved reliability can be obtained.

In the prismatic nonaqueous electrolyte secondary battery 10 of the embodiment, the width of the first region 16a of the positive electrode collector 16 is large, and two second regions 16b are formed in opposite directions with respect to the first region 16a, by way of example. However, some prismatic nonaqueous secondary batteries have a small width in which the positive electrode collector has only one second region. The embodiment can be equally applied to such a narrow prismatic nonaqueous electrolyte secondary battery. In this case, when the second region 16b of the positive electrode collector 16 is brought into abutment with and resistance-welded to one side of the positive electrode substrate exposed portions 14 stacked together, a positive electrode collector receiving member (not shown) of the same material as the positive electrode collector 16 is brought into abutment with the other side of the positive electrode substrate exposed portions 14, and resistance welding is performed by feeding welding current between the second region 16a of the positive electrode collector 16 and the positive electrode collector receiving member.

In the prismatic nonaqueous electrolyte secondary battery 10 in the foregoing embodiment, resistance welding is used as a connection method between the positive electrode collector 16 and the positive electrode substrate exposed portions 14, by way of example. However, the connection method may not be limited to resistance welding and may be laser welding or ultrasonic welding. Furthermore, the positive electrode collector 16 can be connected to the tip surfaces of the positive electrode substrate exposed portions 14.

The configuration on the positive electrode side described in the prismatic nonaqueous electrolyte secondary battery 10 in the foregoing embodiment may be employed as a configuration on the negative electrode side. When the configuration having the current interruption mechanism 35 as described above is employed on the negative electrode side, the current interruption mechanism does not have to be employed and the configuration on the negative electrode side as shown in FIG. 6 can be employed, on the positive electrode side.

What is claimed is:

1. A prismatic secondary battery comprising:
a prismatic outer casing having a mouth;
an electrode assembly housed inside the prismatic outer casing and having a positive electrode plate and a negative electrode plate;
a positive electrode collector electrically connected to the positive electrode plate;
a negative electrode collector electrically connected to the negative electrode plate;
a sealing body sealing the mouth of the outer casing;
a positive electrode external terminal containing an aluminum-based metal and a negative electrode external terminal containing a copper-based metal, each inserted into a through-hole provided in the sealing body while being electrically insulated from the sealing body with an insulating member interposed therebetween; and
a positive electrode terminal plate and a negative electrode terminal plate arranged on the positive electrode external terminal and the negative electrode external terminal, respectively,
the positive electrode collector and the negative electrode collector being electrically connected to the positive electrode terminal plate and the negative electrode terminal plate, respectively,
the positive electrode terminal plate and the negative electrode terminal plate each having a through-hole having a tapered portion formed on the upper end side thereof,
the positive electrode external terminal and the negative electrode external terminal each having an upper end portion inserted into the through-holes of the positive electrode terminal plate and the negative electrode terminal plate, respectively, from the lower end side thereof, the upper end portions of the positive electrode external terminal and the negative electrode external terminal being crimped on the upper end side to be mechanically and electrically connected to the positive electrode terminal plate and the negative electrode terminal plate, respectively,
the crimped portions of the positive electrode external terminal and the negative electrode external terminal each having a plurality of weld spots formed adjacent to the positive electrode terminal plate and the negative electrode terminal plate, respectively, by application of high energy beams, and
the contact area between the positive electrode terminal plate and the crimped portion of the positive electrode external terminal being smaller than the contact area between the negative electrode terminal plate and the crimped portion of the negative electrode external terminal, and the volume of the crimped portion of the positive electrode external terminal being larger than that of the crimped portion of the negative electrode external terminal.

2. The prismatic secondary battery according to claim 1, wherein the contact area between the positive electrode terminal plate and the crimped portion of the positive electrode external terminal is not less than 4.0 mm$^2$ and not more than 20.0 mm$^2$, the volume of the crimped portion of the positive electrode external terminal is not less than 3.0 mm$^3$ and not more than 25.0 mm$^3$, the contact area between the negative electrode terminal plate and the crimped portion of the negative electrode external terminal is not less than 7.0 mm$^2$ and not more than 30.0 mm$^2$, and the volume of the crimped portion of the negative electrode external terminal is not less than 2.5 mm$^3$ and not more than 20.0 mm$^3$.

3. The prismatic secondary battery according to claim 1, wherein the shape of the crimped portions of the positive electrode external terminal and the negative electrode external terminal is annular.

4. The prismatic secondary battery according to claim 2, wherein the shape of the crimped portions of the positive electrode external terminal and the negative electrode external terminal is annular.

5. The prismatic secondary battery according to claim 3, wherein the crimped portions of the positive electrode external terminal and the negative electrode external terminal are each formed by deforming a cylindrical member by spinning crimping.

6. The prismatic secondary battery according to claim 4, wherein the crimped portions of the positive electrode external terminal and the negative electrode external terminal are each formed by deforming a cylindrical member by spinning crimping.

7. The prismatic secondary battery according to claim 1, wherein the weld spots are larger on the positive electrode side than on the negative electrode side.

8. The prismatic secondary battery according to claim 1, wherein a plurality of weld spots are formed along the boundary of each of the crimped portions of the positive electrode external terminal and the negative electrode external terminal.

9. The prismatic secondary battery according to claim 7, wherein the weld spots are formed so as to be spaced from each other at regular intervals along the boundary of each of the crimped portions.

10. The prismatic secondary battery according to claim 8, wherein the weld spots are formed so as to be spaced from each other at regular intervals along the boundary of each of the crimped portions.

11. The prismatic secondary battery according to claim 1, wherein a pressure-sensitive current interruption mechanism is provided at least one of between the positive electrode collector and the positive electrode external terminal and between the negative electrode collector and the negative electrode external terminal.

12. The prismatic secondary battery according to claim 1, wherein the electrode assembly is a flattened electrode assembly that has a plurality of stacked positive electrode substrate exposed portions at one end, and a plurality of stacked negative electrode substrate exposed portions at the other end, the positive electrode substrate exposed portions are disposed so as to face one sidewall of the prismatic outer casing, the negative electrode substrate exposed portions are disposed so as to face the other sidewall of the prismatic outer casing, the positive electrode collector is connected to the positive electrode substrate exposed portions, and the negative electrode collector is connected to the negative electrode substrate exposed portions.

* * * * *